United States Patent
Tetelbaum et al.

(10) Patent No.: US 8,799,839 B1
(45) Date of Patent: Aug. 5, 2014

(54) EXTRACTION TOOL AND METHOD FOR DETERMINING MAXIMUM AND MINIMUM STAGE DELAYS ASSOCIATED WITH INTEGRATED CIRCUIT INTERCONNECTS

(75) Inventors: Alexander Y. Tetelbaum, Hayward, CA (US); Richard A. Laubhan, Windsor, CO (US)

(73) Assignee: LSI Corporation, Milpitas, CA (US)

( * ) Notice: Subject to any disclaimer, the term of this patent is extended or adjusted under 35 U.S.C. 154(b) by 1123 days.

(21) Appl. No.: 12/179,070

(22) Filed: Jul. 24, 2008

(51) Int. Cl.
*G06F 17/50* (2006.01)

(52) U.S. Cl.
USPC ............ 716/108; 716/110; 716/113; 716/114; 716/115; 716/119; 716/134

(58) Field of Classification Search
CPC . G06F 17/50; G06F 17/5022; G06F 17/5027; G06F 17/5031; G06F 17/5036; G06F 17/5045; G06F 17/5059; G06F 17/5068; G06F 2217/84
USPC .......... 716/100, 106–114, 119–120, 132, 134
See application file for complete search history.

(56) References Cited

U.S. PATENT DOCUMENTS

| | | | |
|---|---|---|---|
| 5,471,409 A * | 11/1995 | Tani | 703/14 |
| 6,209,122 B1 * | 3/2001 | Jyu et al. | 716/113 |
| 2006/0103434 A1 * | 5/2006 | Okamoto et al. | 327/77 |
| 2006/0197556 A1 * | 9/2006 | Kang et al. | 326/87 |
| 2008/0077900 A1 * | 3/2008 | Oh et al. | 716/11 |
| 2010/0057971 A1 * | 3/2010 | Kao | 710/305 |

* cited by examiner

*Primary Examiner* — Paul Dinh

(57) ABSTRACT

An extraction tool for, and method of, determining a stage delay associated with an integrated circuit (IC) interconnect. In one embodiment, the extraction tool includes: (1) a driver strength estimator configured to extract dimensions of a driver associated with the interconnect and estimate a driver strength therefrom, (2) a driver delay estimator coupled to the driver strength estimator and configured to estimate a driver delay based on the driver strength, (3) an interconnect delay estimator configured to estimate an interconnect delay based on extracted C and RC parameters associated with the interconnect and (4) a stage delay estimator coupled to the driver delay estimator and the interconnect delay estimator and configured to estimate the stage delay based on the driver delay and the interconnect delay.

20 Claims, 7 Drawing Sheets

US 8,799,839 B1

EXTRACTION TOOL AND METHOD FOR DETERMINING MAXIMUM AND MINIMUM STAGE DELAYS ASSOCIATED WITH INTEGRATED CIRCUIT INTERCONNECTS

TECHNICAL FIELD

The invention is directed, in general, to integrated circuit (IC) testing and, more specifically, to an extraction tool and method for determining maximum and minimum stage delays associated with IC interconnects ("nets").

BACKGROUND

Electronic design automation (EDA) tools, a category of computer aided design (CAD) tools, are used by electronic circuit designers to create representations of circuit configurations, including representations of cells (e.g., transistors) and the interconnects they drive. EDA tools allow designers to construct a circuit and simulate its performance using a computer and without requiring the costly and lengthy process of fabrication. For this reason, EDA tools have proven useful and popular.

One type of EDA tool, an extraction tool, performs electric circuit extraction, or simply "extraction," which is a translation of an IC layout back into the electrical circuit ("netlist") it is intended to represent. Extracted circuits may be needed for various purposes, including circuit simulation, static timing analysis (STA) and statistical timing analysis (SSTA). In extraction, an informal distinction is often made between designed devices, which are devices that are deliberately created by the designer, and parasitic devices, which were not explicitly intended by the designer but are inherent in the layout of the circuit. Accordingly, the typical extraction occurs in three phases: designed device extraction, interconnect extraction, and parasitic device extraction. Commercially available extraction tools (e.g., Star-RCXT™ from Synopsys, Inc., of Mountain View, Calif.) allow the extraction of interconnect (net) RC values using foundry-supplied process variation models such as: (1) a model conventionally called "Cworst" that represents maximum net capacitance and minimum net resistance, (2) a model conventionally called "RCworst" that represents maximum net resistance and net capacitance slightly higher than minimum, (3) a model conventionally called "Cbest" that represents minimum net capacitance and maximum net resistance, (4) a model conventionally called "RCbest" that represents minimum net resistance and net capacitance slightly less than maximum and (5) a model conventionally called "RCtyp" that represents a typical (nominal) net resistance and typical (nominal) net capacitance.

The Cworst and RCworst models are often but not always used for checking setup violations, because they tend to indicate the largest time delays. The Cbest and RCbest models are often but not always used for checking hold violations, because they tend to indicate the smallest time delays. The RCtyp model is rarely used but not so rarely as to be disregarded.

SUMMARY

One aspect of the invention provides an extraction tool for determining a stage delay associated with an IC net. In one embodiment, the extraction tool includes: (1) a driver strength estimator configured to extract dimensions of a driver associated with the net and estimate a driver strength therefrom, (2) a driver delay estimator coupled to the driver strength estimator and configured to estimate a driver delay based on the driver strength, (3) a net delay estimator configured to estimate a net delay based on extracted C and RC parameters associated with the net and (4) a stage delay estimator coupled to the driver delay estimator and the net delay estimator and configured to estimate the stage delay based on the driver delay and the net delay. In an embodiment to be illustrated and described, the stage delay becomes part of a delay model (e.g., "Dworst" or "Dbest") that obviates the need to use the above-described Cworst, RCworst, Cbest, RCbest and RCtyp process variation models to analyze setup and hold delays.

In another embodiment, the extraction tool includes: (1) a driver strength estimator configured to extract lengths and widths of drivers associated with the nets and estimate driver strengths therefrom, (2) a driver delay estimator coupled to the driver strength estimator and configured to estimate driver delays based on the driver strengths, (3) a net delay estimator configured to estimate net delays based on extracted C and RC parameters associated with the nets and (4) a stage delay estimator coupled to the driver delay estimator and the net delay estimator and configured to estimate the maximum and minimum stage delays based on the driver delays and the net delays.

Another aspect of the invention provides a method of determining a stage delay associated with an integrated circuit net. In one embodiment, the method includes: (1) extracting dimensions of a driver associated with the net, (2) estimating a driver strength from the dimensions, (3) estimating a driver delay based on the driver strength, (4) estimating a net delay based on extracted C and RC parameters associated with the net and (5) estimating the stage delay based on the driver delay and the net delay.

The foregoing has outlined certain aspects and embodiments of the invention so that those skilled in the pertinent art may better understand the detailed description of the invention that follows. Additional aspects and embodiments will be described hereinafter that form the subject of the claims of the invention. Those skilled in the pertinent art should appreciate that they can readily use the disclosed aspects and embodiments as a basis for designing or modifying other structures for carrying out the same purposes of the invention. Those skilled in the pertinent art should also realize that such equivalent constructions do not depart from the scope of the invention.

BRIEF DESCRIPTION OF THE DRAWINGS

For a more complete understanding of the invention, reference is now made to the following descriptions taken in conjunction with the accompanying drawings, in which.

Figure 1:
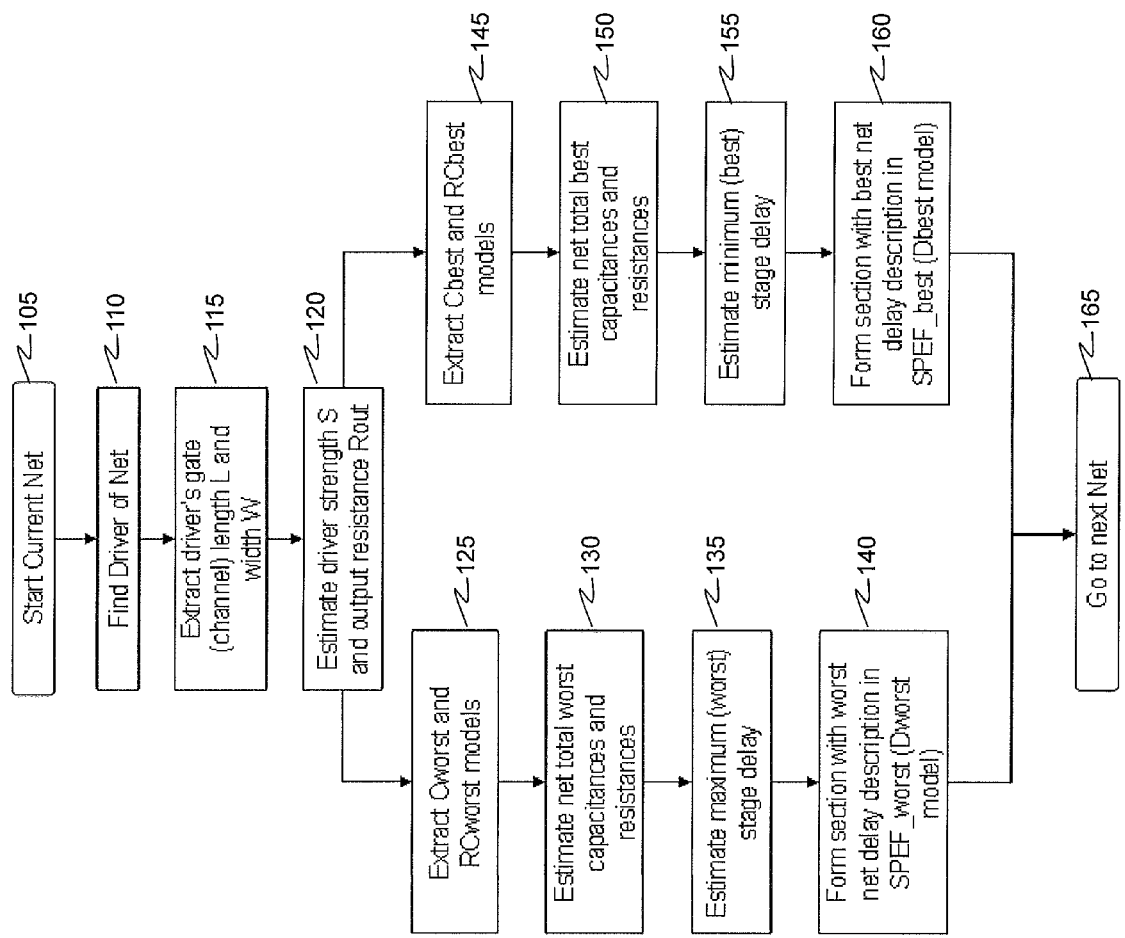
FIG. 1 is a flow diagram of one embodiment of a method of determining maximum and minimum delays associated with IC interconnects carried out according to the principles of the invention.

DETAILED DESCRIPTION OF CERTAIN
ASPECTS AND EMBODIMENTS

As stated above, the Cworst and RCworst models are often used for checking setup violations, because they tend to produce the largest time delays, and the Cbest and RCbest models are often used for checking hold violations, because they tend to produce the smallest time delays. Unfortunately, it has heretofore not been possible to know beforehand which models will most accurately indicate the maximum and minimum delays for any particular logic element in a given path. It has been discovered that stage delays (which includes both device driver and interconnect delays) are a function of not only net parameters but also the output driver (cell) resistance. Current extraction techniques require generating and storing up to eight models. The models cover all four process corners (i.e., combinations of process parameter extremes) of the design extracted at cold and hot operating temperature extremes. Separate timing analyses are then run for all eight models. Run time and disk space requirements are substantially increased. Further, since each of the eight analyses generates two reports (a "min" report for hold violations and a "max" report for setup violations), hold and setup violations originating from 16 separate timing reports may have to be repaired. Ultimately, the time and expense required to take a new IC to market may dramatically increase.

Described herein are extraction tools and methods for extraction that result in an RC model that takes into account driver strength (driver resistance). In one embodiment, files corresponding to two parasitic models are generated: one containing maximum delays and one containing minimum delays (hereinafter called "Dworst" and "Dbest" models). The models obviate the need to use the above-described Cworst, RCworst, Cbest, RCbest and RCtyp process variation models. In one embodiment, the file or files assume IEEE's well-known Standard Parasitic Exchange Format (SPEF). However, those skilled in the art will understand that other conventional or later-developed file formats, such as the Reduced Parasitic Exchange Format (RSPF) and the Detailed Parasitic Exchange Format (DSPF), are within the broad scope of the invention.

One embodiment of a method will now be described. In the embodiment, net properties and drive strengths of the cells that drive the nets (the drivers) are evaluated. Then, stage delays are estimated as sums of net delays and driver delays. Next, C or RC parameters that cause maximum stage delays are used to create a file (hereinafter called "SPEF_worst") containing the Dworst model, and C or RC parameters that cause minimum stage delays are used to create a file (hereinafter called "SPEF_best") containing the Dbest model. Those skilled in the art should understand that it may not be desirable in some applications to determine both maximum and minimum delays for a given design. Accordingly, the invention encompasses systems and methods that generate only one model, either Dworst or Dbest, for a given design. For this reason, the maximum (worst) and the minimum (best) may sometimes be generically referred to herein as the "extreme." Thus, an extreme may be either a worst or a best, a maximum or a minimum.

FIG. 1 is a flow diagram of one embodiment of a method of determining maximum and minimum delays associated with IC interconnects carried out according to the principles of the invention. The method starts in a step 105, when it is desired to analyze a particular net in a given design. In FIG. 1, that particular net is called a "current net." In a step 110, the driver of the current net is found. In the illustrated embodiment, the output terminal of the driver of the net is found, and net parameters are extracted from the layout.

Figure 2:
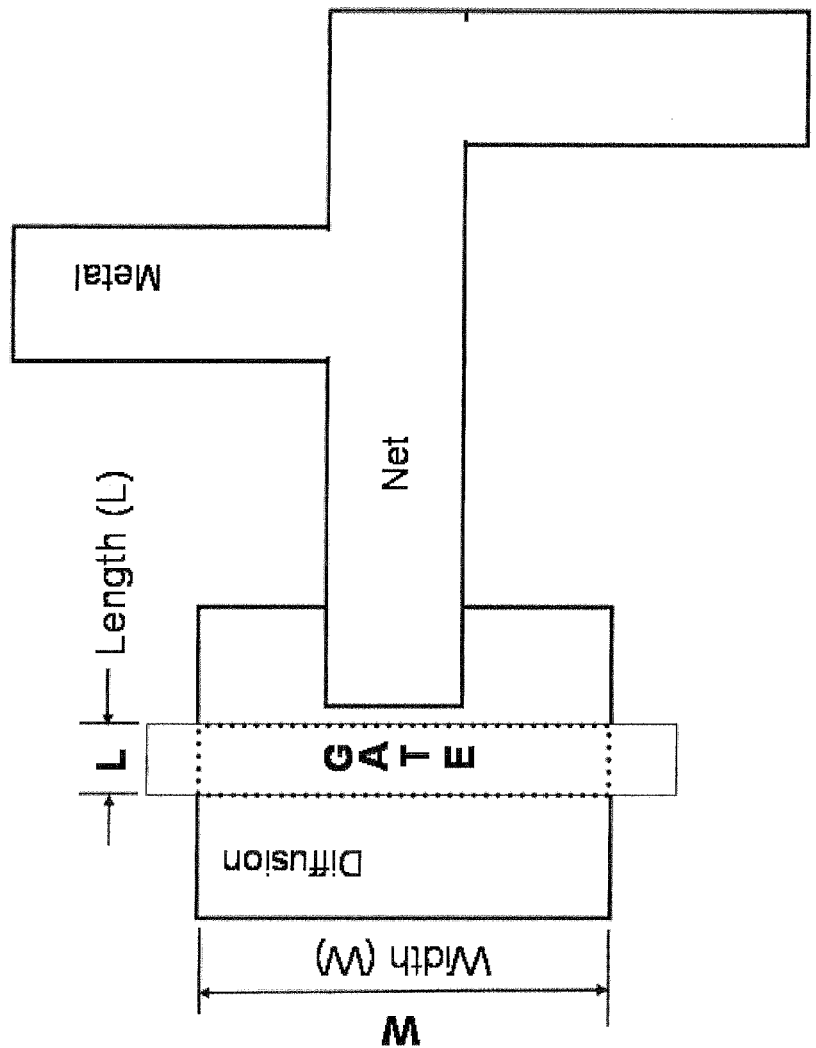
FIG. 2 is an example of a transistor gate taken from a physical design layout description of an IC and having a certain driver strength.

In a step 115, the driver's gate (channel) length, L, and width, W, are extracted. Turning briefly to FIG. 2, illustrated is an example of a transistor gate taken from a physical design layout description of an IC and having a certain driver strength. FIG. 2 shows how gate length and width may be determined. These are extracted from the layout.

Figure 3:
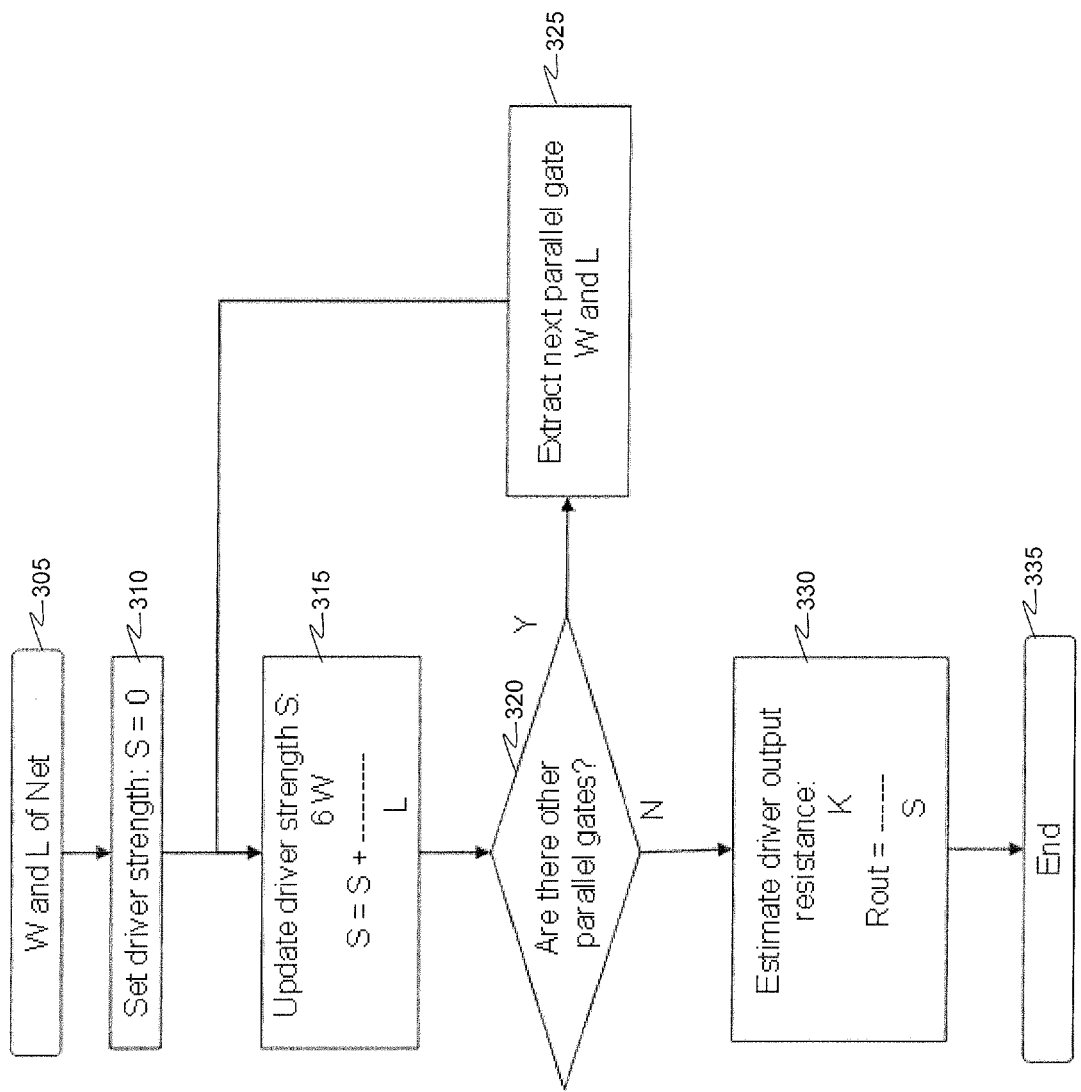
FIG. 3 is a flow diagram of one embodiment of a method of estimating a driver strength, S, and output resistance, Rout, carried out according to the principles of the invention.
Figure 4:
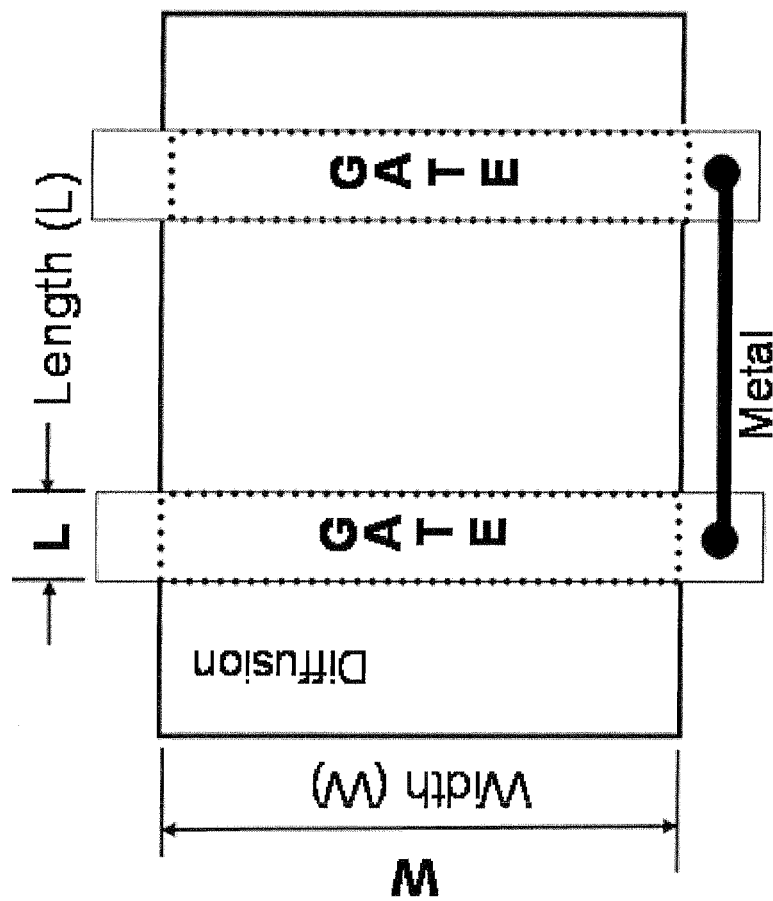
FIG. 4 is an example of two parallel transistor gates that cooperate approximately to double driver strength.

In a step 120, the driver strength, S, and output resistance, Rout, are determined. Turning briefly to FIG. 3, illustrated is a flow diagram of one embodiment of a method of estimating a driver strength, S, and output resistance, Rout, carried out according to the principles of the invention. In a step 305, the length, L, and width, W, of the net are extracted from the layout. In a step 310, the driver strength, S, is initially set to 0. In a step 315, the driver strength, S, is updated by the following equation:

$$S = S + (6W/L).$$

In a step 320, it is determined whether an additional parallel driver exists. If so, the length, L, and width, W, of that parallel driver is extracted from the layout, and the driver strength is updated in the step 315 as shown. The steps 325 and 315 are repeated for any additional parallel drivers that may exist until all parallel drivers are accounted for in the updating of the driver strength, S. Accordingly, the step 320 is answered in the negative. In a step 330, the driver output resistance, Rout, is estimated by the following equation:

$$Rout = K/S,$$

where K is a known, process-dependent constant that characterizes the material constituting the driver.

In an alternative embodiment of the method, the driver output resistance, Rout, is determined another way. Using the net name of the driver cell, the type of the driver cell (connected to the net) may be obtained from the design netlist, Rout may then be obtained directly from the cell library. This Rout is more accurate than the estimated value derived by way of the embodiment of FIG. 3. However, this embodiment requires the extraction tool to read the cell library.

Returning to FIG. 1, distributed net capacitances corresponding to the Cworst and RCworst models are extracted in a step 125. First the extractor performs extraction of distributed net capacitances, C1w, and resistances, R1w, corresponding to the Cworst model. Then, the extractor performs extraction of distributed net capacitances, C2w, and resistances, R2w, corresponding to the RCworst model. A conventional extraction tool such as Star-RCX™ may be used to perform the step 125.

Figure 5:
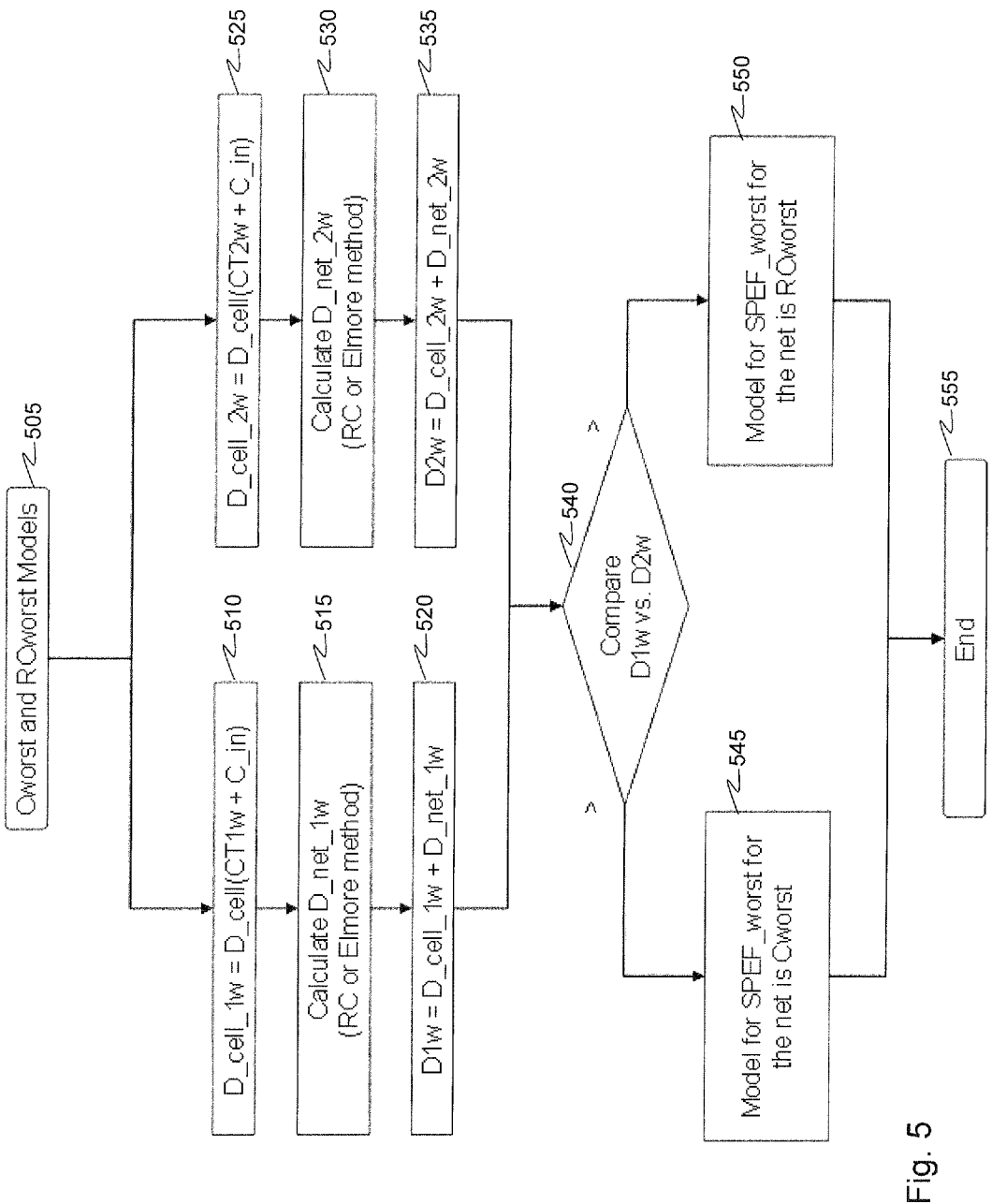
FIG. 5 is a flow diagram of one embodiment of a method of identifying an extraction model to use for a particular stage based on relative stage delays, D1w and D2w, carried out according to the principles of the invention.

In steps 130, 135, 140, the net total worst capacitances and resistances are estimated, the maximum (worst) stage delay is estimated, and a section reflecting the maximum (worst) net delay for the current net is formed in SPEF_worst. FIG. 5 describes in greater detail one embodiment of a method of carrying out the steps 130, 135, 140. Turning briefly to FIG. 5, illustrated is a flow diagram of one embodiment of a method of identifying an extraction model to use for a particular stage based on relative stage delays, D1w and D2w, carried out according to the principles of the invention. The method of FIG. 5 starts in a step 505.

The total net capacitance, CT1w, for the Cworst model is a sum of distributed capacitances, C1w. The total net resistance, RT1w, for the Cworst model is a sum of distributed resistances, R1w, along the longest resistive path in the net (between the driver and the most remote receiver). The driver delay with load, D_cell__1W, is first calculated in a step 510 and equals the total net capacitance, CT1w, plus the total input capacitance, C_in, of all receivers in the net (a sum of all receivers' input capacitances), viz.:

$$D\_cell\_1w = D\_cell(CT1w + C\_in),$$

where D_cell is a delay table for the driver.

The net delay, D_net__1w, is next calculated in a step 515. One relatively simple way to estimate the net delay, D_net__1w, is to calculate delay as an RC multiplication, viz.:

$$D\_net\_1w = (Rout + RT1w) * CT1w.$$

If better accuracy is needed, the net delay, D_net__1w, can be found by using the well-known Elmore delay model that calculates D_net__1w as a function of distributed capacitances, C1w, and resistances, R1w, including the driver resistance Rout.

The maximum (worst) stage delay, D1w, is then estimated in a step 520. The stage delay, D1w, for the Cworst model is:

$$D1w = D\_cell\_1w + D\_net\_1w.$$

The total net capacitance, CT2w, for the RCworst model is a sum of distributed capacitances, C2w. The total net resistance, RT2w, for the RCworst model is a sum of distributed resistances, R2w, along the longest resistive path in the net. The driver delay with load, D_cell__2w, is first calculated in a step 525 and equals the total net capacitance, CT2w, plus the total input capacitance, C_in, of all receivers in the net (a sum of all receivers' input capacitances), viz.:

$$D\_cell\_2w = D\_cell(CT2w + C\_in),$$

where D_cell is a delay table for the driver.

The net delay, D_net__2w, is next calculated in a step 530. One relatively simple way to estimate the net delay, D_net__2w, is to calculate delay as an RC multiplication, viz.:

$$D\_net\_2w = (Rout + RT2w) * CT2w.$$

If better accuracy is needed, the net delay, D_net__2w, can be found by using the well-known Elmore delay model that calculates D_net__2w as a function of distributed capacitances, C2w, and resistances, R2w, including the driver resistance Rout.

The maximum (worst) stage delay, D2w, is then estimated in a step 535. The stage delay, D2w, for the RCworst model is:

$$D2w = D\_cell\_2w + D\_net\_2w.$$

Finally, a decision is made in a step 540 as to which extraction model to use for the stage. The decision is based which stage delay (D1w or D2w) produces greater delay. If D1w is greater than D2W, the Cworst model is selected for the current net in a step 545. If D2w is greater than D1W, the RCworst model is selected for the current net in a step 550. The method ends in a step 555.

Returning to FIG. 1, distributed net capacitances corresponding to the Cbest and RCbest models are extracted in a step 145. First the extractor performs extraction of distributed net capacitances, C1b, and resistances, R1b, corresponding to the Cbest model. Then, the extractor performs extraction of distributed net capacitances, C2b, and resistances, R2b, corresponding to the RCbest model. A conventional extraction tool such as Star-RCXT™ may be used to perform the step 145.

Figure 6:
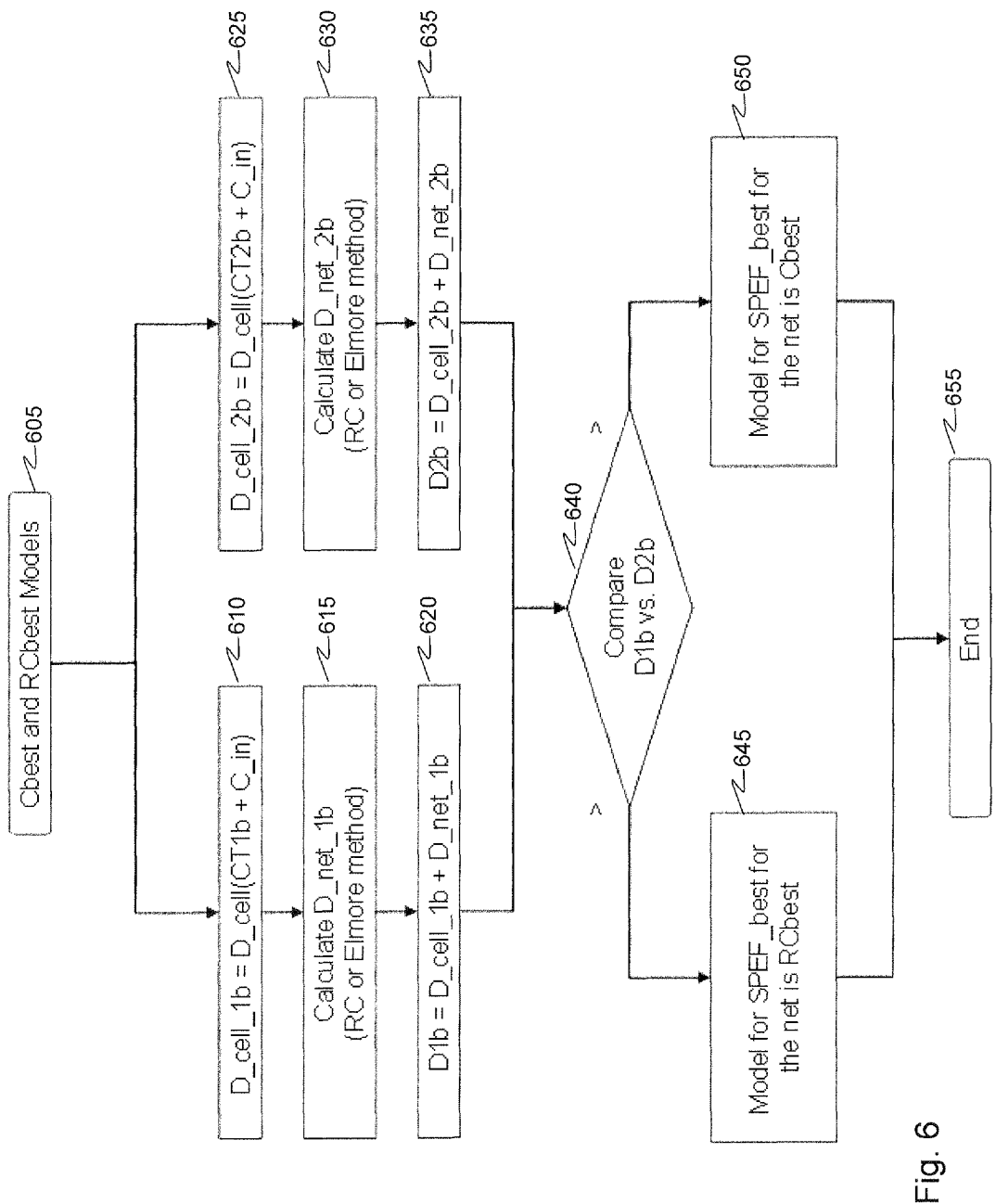
FIG. 6 is a flow diagram of one embodiment of a method of identifying an extraction model to use for a particular stage based on relative stage delays, D1b and D2b, carried out according to the principles of the invention.

In steps 150, 155, 160, the net total best capacitances and resistances are estimated, the minimum (best) stage delay is estimated, and a section reflecting the minimum (best) net delay for the current net is formed in SPEF_best. FIG. 6 describes in greater detail one embodiment of a method of carrying out the steps 150, 155, 160. Turning briefly to FIG. 6, illustrated is a flow diagram of one embodiment of a method of identifying an extraction model to use for a particular stage based on relative stage delays, D1b and D2b, carried out according to the principles of the invention. The method of FIG. 6 starts in a step 605.

The total net capacitance, CT1b, for the Cbest model is a sum of distributed capacitances, C1b. The total net resistance, RT1b, for the Cbest model is a sum of distributed resistances, R1b, along the longest resistive path in the net (between the driver and the most remote receiver). The driver delay with load, D_cell__1b, is first calculated in a step 610 and equals the total net capacitance, CT1b, plus the total input capacitance, C_in, of all receivers in the net (a sum of all receivers' input capacitances), viz.:

$$D\_cell\_1b = D\_cell(CT1b + C\_in),$$

where D_cell is a delay table for the driver.

The net delay, D_net__1b, is next calculated in a step 615. One relatively simple way to estimate the net delay, D_net__1b, is to calculate delay as an RC multiplication, viz.:

$$D\_net\_1b = (Rout + RT1b) * CT1b.$$

If better accuracy is needed, the net delay, D_net__1b, can be found by using the well-known Elmore delay model that calculates D_net__1b as a function of distributed capacitances, C1b, and resistances, R1b, including the driver resistance Rout.

The minimum (best) stage delay, D1b, is then estimated in a step 620. The stage delay, D1b, for the Cbest model is:

$$D1b = D\_cell\_1b + D\_net\_1b.$$

The total net capacitance, CT2b, for the RCbest model is a sum of distributed capacitances, C2b. The total net resistance, RT2b, for the RCbest model is a sum of distributed resistances, R2b, along the longest resistive path in the net. The driver delay with load, D_cell__2b, is first calculated in a step 625 and equals the total net capacitance, CT2b, plus the total input capacitance, C_in, of all receivers in the net (a sum of all receivers' input capacitances), viz.:

$$D\_cell\_2b = D\_cell(CT2b + C\_in),$$

where D_cell is a delay table for the driver.

The net delay, D_net__2b, is next calculated in a step 630. One relatively simple way to estimate the net delay, D_net__2b, is to calculate delay as an RC multiplication, viz.:

$$D\_net\_2b = (Rout + RT2b) * CT2b.$$

If better accuracy is needed, the net delay, D_net__2b, can be found by using the well-known Elmore delay model that calculates D_net__2b as a function of distributed capacitances, C2b, and resistances, R2b, including the driver resistance Rout.

The minimum (best) stage delay, D2b, is then estimated in a step 635. The stage delay, D2b, for the RCbest model is:

$$D2b = D\_cell\_2b + D\_net\_2b.$$

Finally, a decision is made in a step 640 as to which extraction model to use for the stage. The decision is based which stage delay (D1b or D2b) produces greater delay. If D1b is greater than D2b, the Cbest model is selected for the current net in a step 645. If D2b is greater than D1b, the RCbest model is selected for the current net in a step 650. The method ends in a step 655. Returning to FIG. 1, a next net is selected as the current net in a step 165, and the method of FIG. 1 is repeated, until all nets desired to be added to the model(s) are analyzed.

Figure 7:
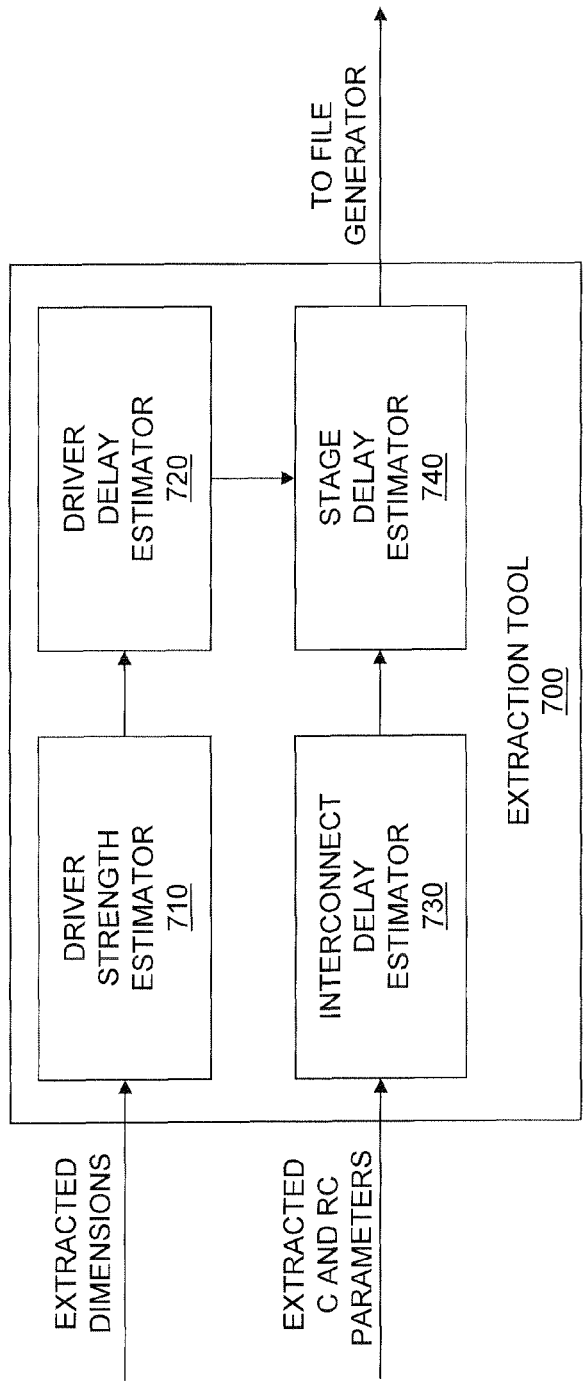
FIG. 7 is a block diagram of one embodiment of an extraction tool for determining maximum and minimum delays associated with IC interconnects constructed according to the principles of the invention.

FIG. 7 is a block diagram of one embodiment of an extraction tool 700 for determining maximum and minimum delays associated with IC interconnects constructed according to the principles of the invention. The extraction tool 700 includes a driver strength estimator 710. The driver strength estimator 710 is configured to extract dimensions of a driver associated with the interconnect and estimate a driver strength therefrom. The extraction tool 700 further includes a driver delay estimator 720. The driver delay estimator 720 is coupled to the driver strength estimator 710 and is configured to estimate a driver delay based on the driver strength. The driver delay estimator 720 may estimate the driver delay based on a total interconnect capacitance, a total input capacitance and a delay table for the driver. The extraction tool 700 further includes an interconnect delay estimator 730. The interconnect delay estimator 730 is configured to estimate an interconnect delay based on extracted C and RC parameters associated with the interconnect. The interconnect delay estimator 730 may estimate the interconnect delay based either an RC multiplication or an Elmore delay model. The extraction tool 700 further includes a stage delay estimator 740. The stage delay estimator 740 is coupled to the driver delay estimator 720 and the interconnect delay estimator 730 and is configured to estimate the stage delay based on the driver delay and the interconnect delay. The stage delay estimator 740 may estimate the stage delay as a sum of the driver delay and the interconnect delay. The stage delay may then be provided to a file generator (not shown) for the purpose of generating one or more files. The one or more files contain either or both of worst and best delay models. The model or models are advantageously used in lieu of, and therefore may eliminate the need for, Cworst, RCworst, Cbest, RCbest and RCtyp process variation models to analyze setup and hold delays.

In addition, embodiments of the invention further relate to computer storage products with a computer-readable medium that have program code thereon for performing various computer-implemented operations. The media and program code may be those specially designed and constructed for the purposes of the invention, or they may be of the kind well known and available to those having skill in the computer software arts. Examples of computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Those skilled in the art to which the invention relates will appreciate that other and further additions, deletions, substitutions and modifications may be made to the described embodiments without departing from the scope of the invention.

What is claimed is:

1. An extraction tool, embodied in program code stored in a non-transitory computer readable storage media, said program code executable by a computer, for determining a stage delay associated with an integrated circuit interconnect, comprising:

a driver strength estimator configured to extract dimensions of a driver from a layout of said driver associated with said interconnect and estimate a driver strength therefrom, wherein said driver is a cell for driving said interconnect;

a driver delay estimator coupled to said driver strength estimator and configured to estimate a driver delay based on said driver strength;

an interconnect delay estimator configured to estimate an interconnect delay based on extracted C and RC parameters associated with said interconnect; and a stage delay estimator coupled to said driver delay estimator and said interconnect delay estimator and configured to estimate said stage delay based on said driver delay and said interconnect delay.

2. The extraction tool as recited in claim 1 wherein said stage delay is an extreme delay selected from the group consisting of:

a maximum delay, and a minimum delay.

3. The extraction tool as recited in claim 1 further comprising a file generator coupled to said stage delay estimator and configured to create a file containing parameters attributable to said stage delay.

4. The extraction tool as recited in claim 1 wherein said dimensions are length and width.

5. The extraction tool as recited in claim 1 wherein said driver delay estimator is configured to estimate said driver delay based on a total interconnect capacitance, a total input capacitance and a delay table for said driver.

6. The extraction tool as recited in claim 1 wherein said interconnect delay estimator is configured to estimate said interconnect delay based on one of:

an RC multiplication, and an Elmore delay model.

7. The extraction tool as recited in claim 1 wherein said stage delay estimator is configured to estimate said stage delay as a sum of said driver delay and said interconnect delay.

8. A method of determining a stage delay associated with an integrated circuit interconnect, comprising:

extracting dimensions of a driver from a layout of said driver associated with said interconnect, wherein said driver is a cell for driving said interconnect;

estimating a driver strength from said dimensions;

estimating a driver delay based on said driver strength;

estimating an interconnect delay based on extracted C and RC parameters associated with said interconnect; and estimating said stage delay based on said driver delay and said interconnect delay, wherein said method is executed by a computer.

9. The method as recited in claim 8 wherein said stage delay is an extreme delay selected from the group consisting of:

a maximum delay, and a minimum delay.

10. The method as recited in claim 8 further comprising creating a file containing parameters attributable to said stage delay.

11. The method as recited in claim 8 wherein said dimensions are length and width.

12. The method as recited in claim 8 wherein said estimating said driver delay comprises estimating said driver delay based on a total interconnect capacitance, a total input capacitance and a delay table for said driver.

13. The method as recited in claim 8 wherein said estimating said interconnect delay comprises estimating said interconnect delay based on one of:
   an RC multiplication, and
   an Elmore delay model.

14. The method as recited in claim 8 wherein said estimating said stage delay comprises estimating said stage delay as a sum of said driver delay and said interconnect delay.

15. An extraction tool, embodied in program code stored in a non-transitory computer readable storage media, said program code executable by a computer, for determining maximum and minimum stage delays associated with integrated circuit interconnects, comprising:
   a driver strength estimator configured to extract lengths and widths of drivers from a layout of said driver associated with said interconnects and estimate driver strengths therefrom, wherein said driver is a cell for driving said interconnect;
   a driver delay estimator coupled to said driver strength estimator and configured to estimate driver delays based on said driver strengths;
   an interconnect delay estimator configured to estimate interconnect delays based on extracted C and RC parameters associated with said interconnects; and
   a stage delay estimator coupled to said driver delay estimator and said interconnect delay estimator and configured to estimate said maximum and minimum stage delays based on said driver delays and said interconnect delays.

16. The extraction tool as recited in claim 15 further comprising a file generator coupled to said stage delay estimator and configured to create a first file containing parameters attributable to said maximum stage delay and a second file containing parameters attributable to said minimum stage delay.

17. The extraction tool as recited in claim 15 wherein said driver delay estimator is configured to estimate said driver delays based on total interconnect capacitances, total input capacitances and delay tables for said drivers.

18. The extraction tool as recited in claim 15 wherein said interconnect delay estimator is configured to estimate said interconnect delays based on one of:
   RC multiplications, and
   Elmore delay models.

19. The extraction tool as recited in claim 15 wherein said stage delay estimator is configured to estimate said stage delays as sums of said driver delays and said interconnect delays.

20. The extraction tool as recited in claim 15 wherein said extraction tool is embodied in program code stored on a non-transitory computer-readable medium.

* * * * *